US008294550B2

(12) United States Patent
Sasakuma

(10) Patent No.: US 8,294,550 B2
(45) Date of Patent: Oct. 23, 2012

(54) AUTHENTICATION SYSTEM, AUTHENTICATION METHOD, AND INFORMATION PROCESSING APPARATUS

(75) Inventor: Haruna Sasakuma, Toyonaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 428 days.

(21) Appl. No.: 12/712,280

(22) Filed: Feb. 25, 2010

(65) Prior Publication Data

US 2010/0245033 A1 Sep. 30, 2010

(30) Foreign Application Priority Data

Mar. 25, 2009 (JP) ................................ 2009-075251

(51) Int. Cl.
*G05B 19/00* (2006.01)
*G06F 7/04* (2006.01)
*H04L 29/06* (2006.01)
*G06K 9/00* (2006.01)
*H04N 5/235* (2006.01)

(52) U.S. Cl. .......... 340/5.2; 340/5.21; 340/5.7; 340/5.8; 726/27; 726/2; 726/12; 726/17; 713/155; 382/115; 382/118; 248/143; 248/156; 248/229.1

(58) Field of Classification Search ........................ None
See application file for complete search history.

(56) References Cited

U.S. PATENT DOCUMENTS 7,733,043 B2 * 6/2010 Casella et al. ................ 318/280
8,107,740 B2 * 1/2012 Ma et al. ........................ 382/225
2004/0017929 A1 * 1/2004 Bramblet et al. ............. 382/103
2007/0050850 A1 3/2007 Katoh et al.
2007/0064105 A1 * 3/2007 Ohshima et al. .............. 348/143
2007/0268145 A1 * 11/2007 Bazakos et al. ............ 340/573.1

FOREIGN PATENT DOCUMENTS

JP 10-031743 2/1998
JP 2002-135221 5/2002
JP 2006-229429 A 8/2006
JP 2007-065824 3/2007
JP 2008-009973 1/2008
JP 2008-217102 9/2008

OTHER PUBLICATIONS

Office Action (Notification of Reason(s) for Refusal) dated Jan. 6, 2011, issued in the corresponding Japanese Patent Application No. 2009-075251, and an English translation thereof.

* cited by examiner

*Primary Examiner* — Jennifer Mehmood
*Assistant Examiner* — Fekadeselassie Girma
(74) *Attorney, Agent, or Firm* — Buchanan Ingersoll & Rooney PC

(57) ABSTRACT

An authentication system is provided with a room-security device, and an information processing apparatus installed in a controlled area controlled by the room-security device, in which the room-security device and the information processing apparatus are connected in a network. The room-security device obtains, from a user, identification information, and transmits the identification information to the information processing apparatus, if the user is permitted to enter a room based on the obtained identification information. The information processing apparatus receives the identification information. If it is detected that the user is alone in the controlled area based on the received identification information, the information processing apparatus performs authentication based on the received identification information instead of asking the user to enter authentication information to obtain the authentication information.

12 Claims, 14 Drawing Sheets

FIG. 5

4311 4312

| ROOM ID | CARD NUMBER |
| --- | --- |
| Room01 | 00000001 |
| | 00000002 |
| | 00000003 |
| | ⋮ |
| Room02 | 00000001 |
| | 00000105 |
| | 00000120 |
| | ⋮ |
| ⋮ | 00000200 |
| | 00000201 |
| | ⋮ |
| Room20 | 00000001 |
| | 00000303 |
| | 00000120 |
| | ⋮ |

FIG. 6

| USER NAME (5111) | PASSWORD (5112) | DEPARTMENT (5113) | PRINT QUANTITY (5114) | COPY QUANTITY (5115) | MAXIMUM PRINT QUANTITY (5116) | MAXIMUM COPY QUANTITY (5117) | PRINT LIMIT (5118) | COPY LIMIT (5119) |
|---|---|---|---|---|---|---|---|---|
| User001 | Pass001 | SALES | 528 | 0 | 1000 | 1000 | PERMITTED | PERMITTED |
| User002 | Pass002 | SALES | 103 | 0 | 600 | 600 | PERMITTED | PERMITTED |
| User003 | Pass003 | SALES | 0 | 10 | 0 | 0 | NOT PERMITTED | PERMITTED |
| User004 | Pass004 | SALES | 58 | 0 | 100 | 100 | MONOCHROME | NOT PERMITTED |
| User011 | Pass011 | DEVELOPMENT | 14 | 1 | 100 | 100 | MONOCHROME | MONOCHROME |
| User013 | Pass013 | DEVELOPMENT | 2 | 2 | 100 | 100 | PERMITTED | PERMITTED |
| User014 | Pass014 | DEVELOPMENT | 625 | 3 | 700 | 700 | PERMITTED | PERMITTED |
| ... | ... | ... | ... | ... | ... | ... | ... | ... |

FIG. 7

5211 5212 5213

| CARD NUMBER | USER NAME | IN/OUT |
|---|---|---|
| 00000001 | User001 | IN |
| 00000002 | User002 | OUT |
| 00000003 | User003 | OUT |
| 00000004 | User004 | IN |
| 00000011 | User011 | IN |
| 00000013 | User013 | OUT |
| 00000014 | User014 | OUT |
| ⋮ | ⋮ | ⋮ |

AUTHENTICATION SYSTEM, AUTHENTICATION METHOD, AND INFORMATION PROCESSING APPARATUS

This application is based on Japanese patent application No. 2009-075251 filed on Mar. 25, 2009, the contents of which are hereby incorporated by reference.

BACKGROUND OF THE INVENTION

1. Field of the Invention

The present invention relates to an information processing apparatus for determining whether or not the use thereof is permitted based on authentication information. More particularly, the present invention relates to a technique for improving the convenience of a user who uses an information processing apparatus installed in an area under the control of a room-security system.

2. Description of the Related Art

In recent years, there has been provided a Multi-Function Peripheral (MFP) that prompts a user to enter authentication information such as a password, and permits the user to use the MFP itself only when the authentication information entered is verified.

For example, a user enters a password through an operational panel or the like provided in an MFP and the password is verified; thereby the user is permitted to make a copy, or start printing based on a print job that the user has previously transmitted to the MFP.

Since an MFP is generally installed in offices, etc., it is assumed, as a prerequisite, that the MFP is used by a plurality of users.

Accordingly, entering authentication information is a requirement to use the MFP in order that a user can be charged the amount corresponding to the use of the MFP, and in order to prevent somebody else from looking at or carrying away a confidential printed material.

Such an MFP requires a user to enter authentication information in order to use the MFP, which may be burdensome to the user.

To cope with this, a technique is disclosed in Japanese Laid-open Patent Publication No. 2006-229429. The technique involves making an ID card-based room-entry device and a multifunction device cooperate with each other, and dispensing with authentication before using image data saved in a box of the multifunction device while an owner of the image data is present in the room.

The technique makes it possible, when the owner is present in the room, to save a user from a burdensome task of entering authentication information before using the image data. The technique also makes it possible, when the owner is absent from the room, to protect the confidentiality of the image data because entering authentication information is required.

Assume that the technique is applied to the use of an MFP. When a user is present in the room, no authentication is performed, which enables people present in the room other than the user to use the MFP. As a result, this reduces the burden on the user; however this lowers the level of confidentiality protection.

SUMMARY

The present disclosure is directed to solve the problems pointed out above, and therefore, an object of an embodiment of the present invention is to provide an authentication system that eliminates the need for entering authentication information only when the level of confidentiality protection is high.

According to an aspect of the present invention, an authentication system includes a room-security device, and an information processing apparatus installed in a controlled area controlled by the room-security device, in which the room-security device and the information processing apparatus are connected in a network. The room-security device includes an identification information obtaining portion that obtains, from a user, identification information of the user, and a control portion that performs a room entry control and a room exit control of the user based on the identification information obtained by the identification information obtaining portion, and transmits, if the user is permitted to enter a room, the identification information to the information processing apparatus. The information processing apparatus includes a receiving portion that receives the identification information from the control portion, and an authentication portion that asks the user to enter authentication information to obtain the authentication information, and performs authentication based on the authentication information thus obtained. If the authentication portion detects, based on the identification information received by the receiving portion, that the user is alone in the controlled area, then the authentication portion stops asking the user to enter the authentication information to obtain the authentication information, and performs the authentication based on the identification information obtained by the identification information obtaining portion of the room-security device.

The authentication system configured as described above does not require a user to enter authentication information if the user is alone in an area controlled by the room-security device.

These and other characteristics and objects of the present invention will become more apparent by the following descriptions of preferred embodiments with reference to drawings.

BRIEF DESCRIPTION OF THE DRAWINGS

FIG. 5 is a diagram illustrating an example of the configuration and details of management information.

FIG. 6 is a diagram illustrating an example of the configuration and details of user information.

FIG. 7 is a diagram illustrating an example of the configuration and details of an in/out management table.

DESCRIPTION OF THE PREFERRED EMBODIMENTS

An authentication system according to this embodiment is configured to, when a user uses an MFP installed in a room under the control of an IC card-based room-security system that manages people entering/leaving the room, save the user from a burdensome task of entering authentication information.

To be specific, in the case where a user is alone in the room, the MFP according to this embodiment does not require the user to enter authentication information.

Stated differently, the case where only one user is present in the room is regarded as an environment under which confidentiality is protected. Thus, the MFP does not require the user to enter authentication information.

It is, however, still necessary to determine whether or not the user is authorized to use the MFP. In view of this, authentication information for using the MFP is obtained from an IC card number that is identification information of the user present in the room for the IC card-based room-security system, and it is determined whether or not the user is authorized to use the MFP.

The authentication system according to this embodiment, thus, is configured to protect confidentiality, save a user from a burdensome task of entering authentication information, and determine whether or not the user is authorized to use the MFP. In other words, the authentication system makes it possible to eliminate the need for entering authentication information only when the level of confidentiality protection is high.

Descriptions are given below of the authentication system according to an embodiment of the present invention, with reference to drawings.

Figure 1:
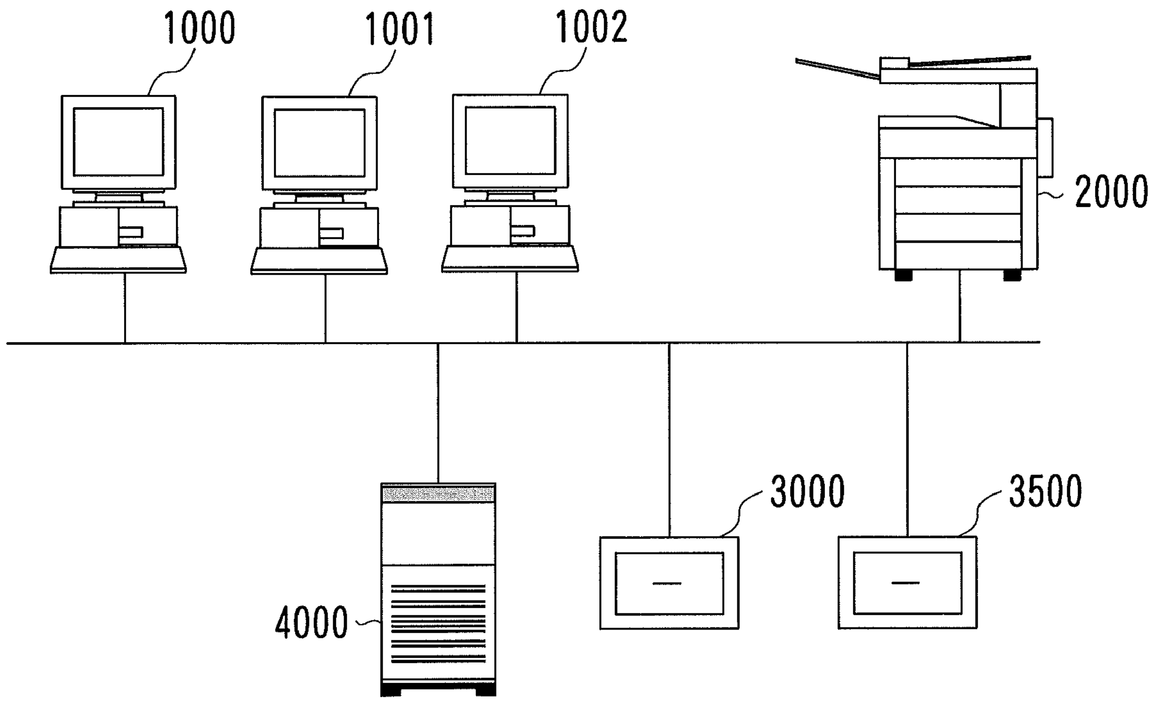
FIG. 1 is a diagram illustrating an example of the overall configuration of an authentication system.

FIG. 1 is a diagram illustrating an example of the overall configuration of an authentication system 100 according to this embodiment.

The authentication system 100 is configured of user terminals 1000, 1001, and 1002, an MFP 2000, a room entry IC card reader 3000, a room exit IC card reader 3500, an IC card-based room-security server 4000, and so on, all of which are connected in a network.

The user terminal 1000 is a terminal for a user to transmit a print job.

Each of the user terminals 1001 and 1002 has the same function as that of the user terminal 1000. Only the user terminal 1000 is described herein as a representative example.

The MFP 2000 is generally called a multifunction device, and is configured to integrate, thereinto, a variety of functions, such as copying, faxing, network printing, scanning, and a box function.

The room entry IC card reader 3000, the room exit IC card reader 3500, and the IC card-based room-security server 4000 constitute the IC card-based room-security system.

Each of the room entry IC card reader 3000 and the room exit IC card reader 3500 serves to read out an IC card number from an IC card.

The IC card-based room-security server 4000 serves to manage, as a history of room entry/exit, an IC card number and the like that are read out by the room entry IC card reader 3000 and the room exit IC card reader 3500.

Figure 2:
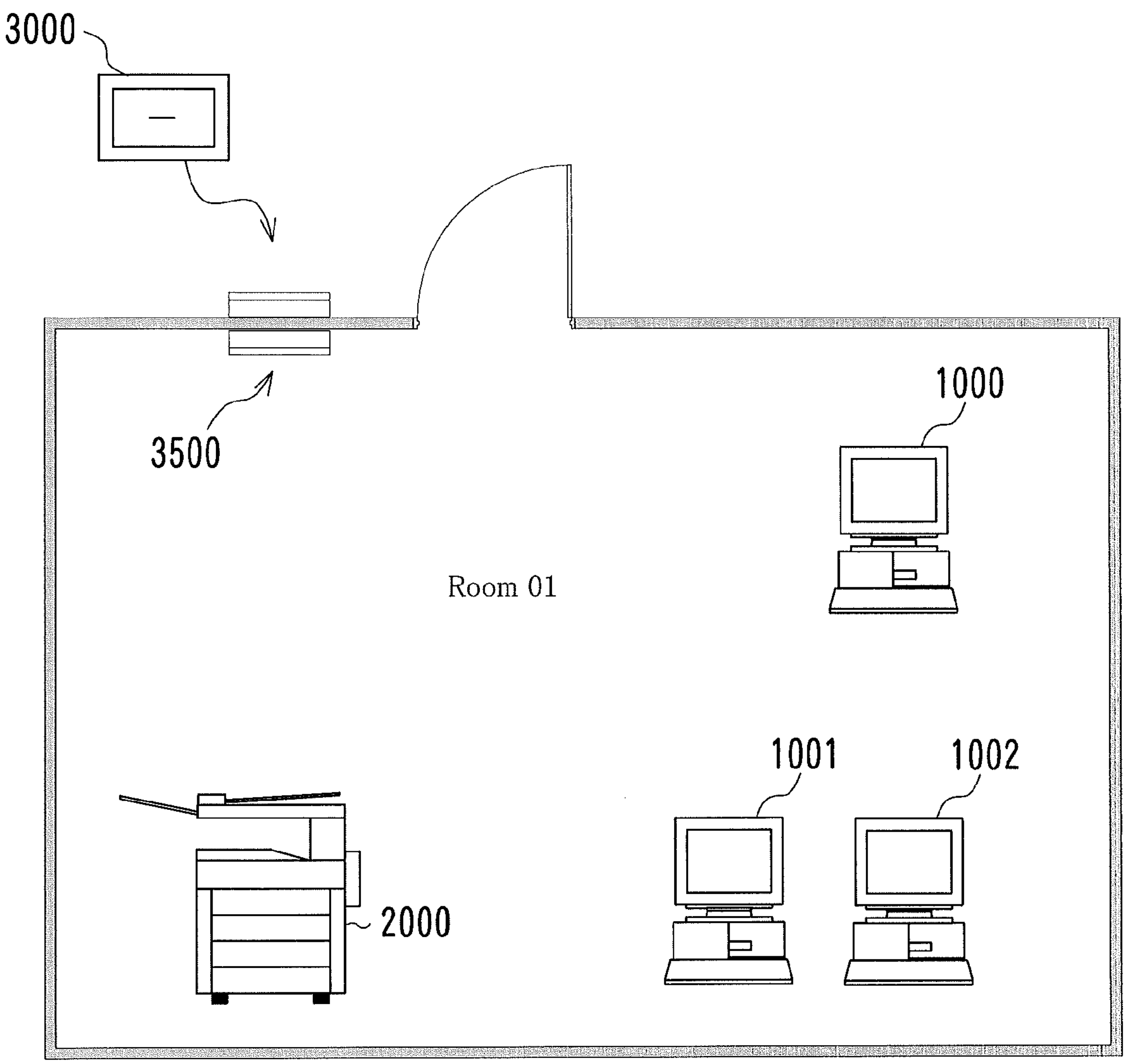
FIG. 2 is a diagram illustrating an example of how an authentication system is used.

FIG. 2 is a diagram illustrating an example of how the authentication system 100 is used.

The room entry IC card reader 3000 is placed externally adjacent to the door of a room named "Room 01", and the room exit IC card reader 3500 is placed internally adjacent thereto.

The MFP 2000 and the user terminals 1000, 1001, and 1002 are installed in the room.

In order for a user to enter the Room 01, the user needs to be authenticated by holding an IC card carried by him/her over the room entry IC card reader 3000. Only when the authentication is successful, an electronic lock on the door is unlocked, which enables the user to enter the Room 01.

Likewise, in order for a user to leave the Room 01, the user needs to be authenticated by holding an IC card carried by him/her over the room exit IC card reader 3500. Only when the authentication is successful, the electronic lock on the door is unlocked, which enables the user to leave the Room 01.

It is assumed that the IC card-based room-security server 4000 is installed in another room.

Descriptions are provided below of the hardware configuration of the MFP 2000.

Figure 3:
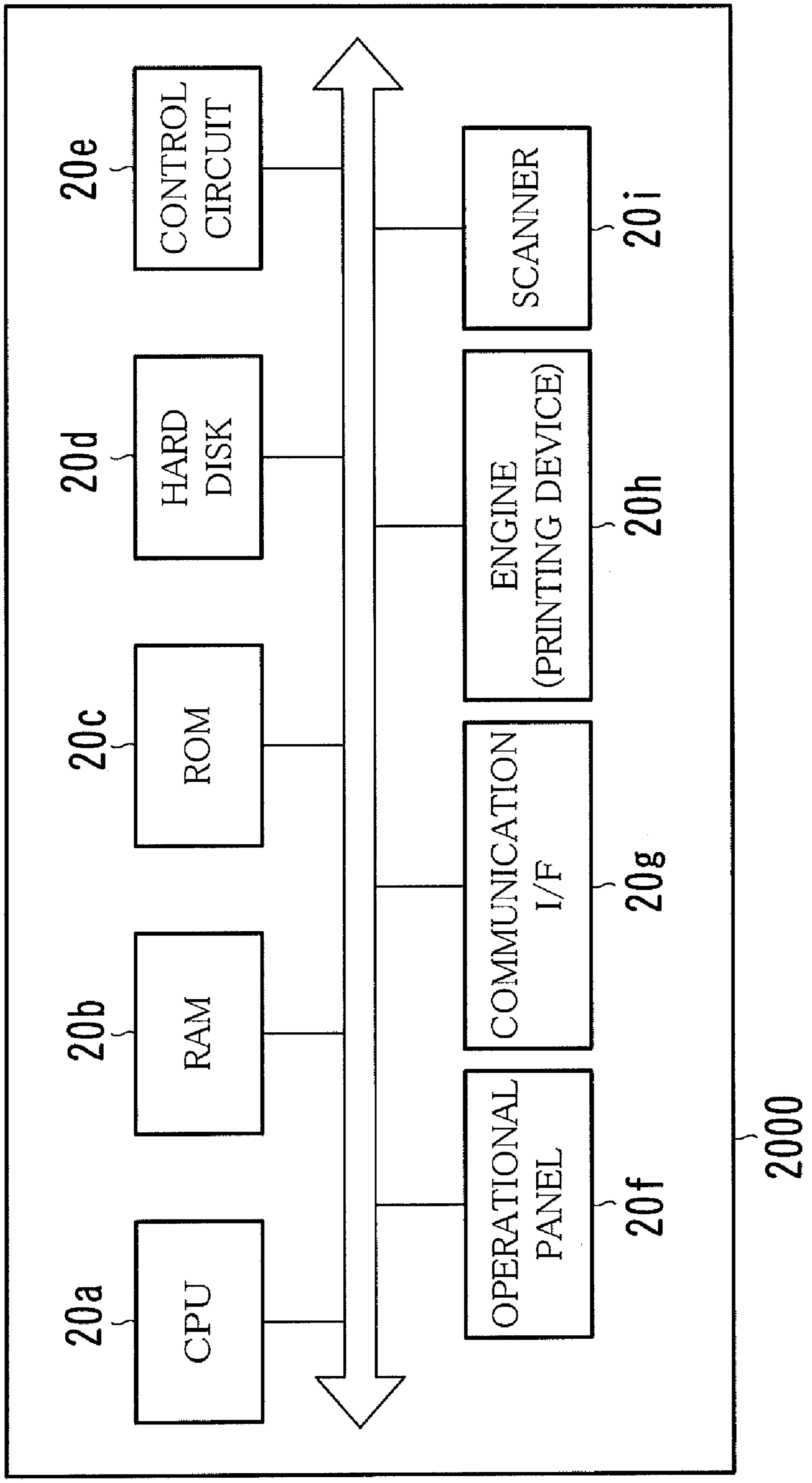
FIG. 3 is a diagram illustrating an example of the hardware configuration of an MFP.

FIG. 3 is a diagram illustrating an example of the hardware configuration of the MFP 2000.

The MFP 2000 is configured of a Central Processing Unit (CPU) 20*a*, a Random Access Memory (RAM) 20*b*, a Read-Only Memory (ROM) 20*c*, a hard disk 20*d*, a control circuit 20*e*, an operational panel 20*f*, a communication interface 20*g*, a printing unit 20*h*, a scanner 20*i*, and so on.

The control circuit 20*e* is a circuit for controlling the hard disk 20*d*, the operational panel 20*f*, the communication interface 20*g*, the printing unit 20*h*, the scanner 20*i*, and so on.

The operational panel 20*f* is a touch-screen display panel that displays, for example, a screen for giving a message or instructions to a user, a screen for the user to enter, for example, desired process type, desired process conditions, and a password, and a screen for displaying the result of a process performed by the CPU 20*a*. The user can give instructions or specify process conditions to the MFP 2000 by touching a predetermined position of the operational panel 20*f*. Thus, the operational panel 20*f* acts as a user interface for the user who operates the MFP 2000.

The communication interface 20*g* is a Network Interface Card (NIC) for communicating with another device such as the user terminal 1001 according to Transmission Control Protocol/Internet Protocol (TCP/IP) via a communication line, or a modem.

The printing unit 20*h* serves to print, onto paper, an image reproduced based on image data stored in a memory or image data of a print job transmitted by the user terminal 1000, and the like.

The scanner 20*i*, which is a so-called image scanner, scans images such as a drawing and a photograph carried on paper to store the images, as image data, in the memory of the MFP 2000. The scanner 20*i* implements a copying function by using the printing unit 20*h* to print an image onto paper based on the image data thus stored.

Descriptions are provided below, with reference to FIG. 4, of the user terminal 1000, the MFP 2000, the room entry IC card reader 3000, the room exit IC card reader 3500, and the IC card-based room-security server 4000, all of which constitute the authentication system 100.

Figure 4:
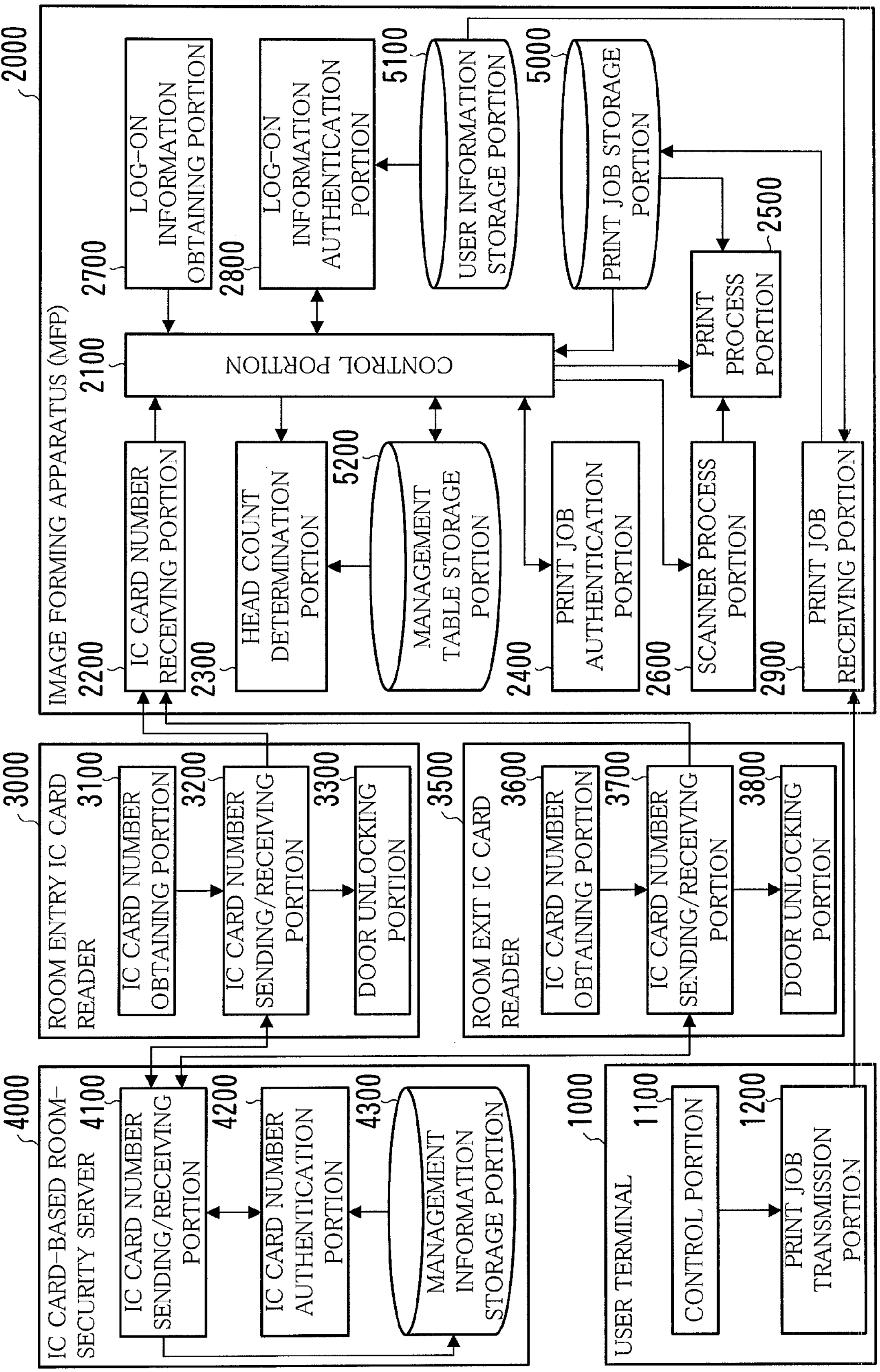
FIG. 4 is a block diagram illustrating an example of the functional configuration of a user terminal, an MFP, a room entry IC card reader, a room exit IC card reader, and an IC card-based room-security server.

FIG. 4 is a block diagram illustrating an example of the functional configuration of the user terminal 1000, the MFP 2000, the room entry IC card reader 3000, the room exit IC card reader 3500, and the IC card-based room-security server 4000.

The user terminal 1000 is a so-called personal computer, and is provided with interfaces such as a display and a keyboard.

The user terminal 1000 includes a control portion 1100 and a print job transmission portion 1200.

A CPU executes programs stored in a memory of the user terminal 1000; thereby the functions of the individual portions of the user terminal 1000 are implemented as described below.

The control portion 1100 performs general control processing necessary for the user terminal 1000, and control processing unique to the present invention.

The print job transmission portion 1200 serves to generate a print job and to transmit the print job to the MFP 2000 in accordance with a command given by the control portion 1100. In short, the print job transmission portion 1200 is a so-called printer driver.

The MFP 2000 is configured of a control portion 2100, an IC card number receiving portion 2200, a head count determination portion 2300, a print job authentication portion 2400, a print process portion 2500, a scanner process portion 2600, a log-on information obtaining portion 2700, a log-on information authentication portion 2800, a print job receiving portion 2900, a print job storage portion 5000, a user information storage portion 5100, a management table storage portion 5200, and the like.

The CPU 20*a* executes programs stored in the memory such as the hard disk 20*d* of the MFP 2000; thereby the functions of the individual portions of the MFP 2000 are implemented as described below.

The control portion 2100 performs general control processing necessary for the MFP 2000, and control processing unique to the present invention.

The IC card number receiving portion 2200 serves to receive an IC card number from the room entry IC card reader 3000 or the room exit IC card reader 3500, and then to inform the control portion 2100 of the IC card number received.

The IC card number receiving portion 2200 informs the control portion 2100, together with the IC card number, of the fact that a user corresponding to the IC card number has entered the room or has left the room. Upon receiving the IC card number from the room entry IC card reader 3000, then the IC card number receiving portion 2200 determines that a user corresponding to the IC card number has entered the room. In contrast, if receiving the IC card number from the room exit IC card reader 3500, then the IC card number receiving portion 2200 determines that a user corresponding to the IC card number has left the room.

Upon receiving a request from the control portion 2100, the head count determination portion 2300 detects how many people are present in the room, and informs the control portion 2100 of the result of detection.

The print job authentication portion 2400 serves to authenticate a print job in response to a request from the control portion 2100. To be specific, the print job authentication portion 2400 determines whether or not a print job is a job transmitted by a user who is permitted to use the MFP 2000. If the print job authentication portion 2400 determines that a print job is a job transmitted by a user who is permitted to use the MFP 2000, then it means that authentication of the print job is successful. In contrast, if the print job authentication portion 2400 determines that a print job is a job transmitted by a user who is not permitted to use the MFP 2000, then it means that authentication of the print job fails.

The print process portion 2500 executes a print job in accordance with a request from the control portion 2100. Specifically, the print process portion 2500 prints, onto paper, an image reproduced based on image data included in the print job, and ejects the paper.

The print process portion 2500 also receives image data via the memory from the scanner process portion 2600, prints, onto paper, an image based on the image data received, and ejects the paper. This process is performed in response to a request from the control portion 2100.

When receiving a request from the control portion 2100, the scanner process portion 2600 scans an image such as a drawing depicted on paper, generates image data thereof, stores the image data in the memory, and sends the image data stored in the memory to the print process portion 2500.

The log-on information obtaining portion 2700 serves to obtain log-on information such as a user name and a password from a user who intends to use the MFP 2000. To be specific, a screen for the user to enter the log-on information is displayed on the operational panel 20*f* and the user name and the like entered by the user are obtained. The log-on information obtaining portion 2700 informs the control portion 2100 of the log-on information thus obtained.

The log-on information authentication portion 2800 performs authentication of log-on information in response to a request from the control portion 2100. Specifically, the log-on information authentication portion 2800 refers to a plurality of pieces of user information stored in the user information storage portion 5100. If the log-on information is indicated in any one of the plurality of pieces of the user information, then it means that the authentication is successful. If the log-on information is not indicated in the plurality of pieces of the user information, then it means that the authentication fails. The log-on information to be authenticated is sent from the control portion 2100 to the log-on information authentication portion 2800.

The print job receiving portion 2900 serves to receive a print job from the user terminal 1000. The print job receiving portion 2900 stores the print job thus received in the print job storage portion 5000. If the print job is transmitted by a user who is not permitted to use the MFP 2000, then the print job receiving portion 2900 discards the print job.

The print job storage portion 5000 stores print jobs therein. A print job is read out from the print job storage portion 5000, and printing is carried out based on image data included in the print job.

The user information storage portion 5100 stores, therein, a plurality of pieces of user information that is information on users permitted to use the MFP 2000.

The management table storage portion 5200 stores, therein, a table for managing a user who is present in the room. Every time when the IC card number receiving portion 2200 receives an IC card number, the control portion 2100 updates the table.

Note that data stored in the user information storage portion 5100 and data stored in the management table storage portion 5200 will be described later in the [DATA] section with reference to drawings.

The room entry IC card reader 3000 is configured of an IC card number obtaining portion 3100, an IC card number sending/receiving portion 3200, a door unlocking portion 3300, and the like.

A CPU executes programs stored in a memory of the room entry IC card reader 3000; thereby the functions of the individual portions of the room entry IC card reader 3000 are implemented as described below.

The IC card number obtaining portion 3100 reads out an IC card number from an IC card possessed by a user. The IC card number obtaining portion 3100 then requests the IC card number sending/receiving portion 3200 to transmit the IC card number thus read out to the IC card-based room-security server 4000.

The IC card number sending/receiving portion 3200 serves to transmit an IC card number to the IC card-based room-security server 4000 or the MFP 2000. To be specific, when receiving a request from the IC card number obtaining portion 3100, the IC card number sending/receiving portion 3200 transmits the IC card number to the IC card-based room-security server 4000, and receives a result of authentication therefrom. If receiving a result that authentication is successful from the IC card-based room-security server 4000, then the IC card number sending/receiving portion 3200 transmits the IC card number to the MFP 2000. Note that the IC card number sending/receiving portion 3200 transmits the IC card number to the IC card-based room-security server 4000 together with a room ID of a room where the room entry IC card reader 3000 and the room exit IC card reader 3500 are installed.

The door unlocking portion 3300 serves to unlock an electronic lock on a door to be controlled in response to a request from the IC card number sending/receiving portion 3200. The door unlocking portion 3300 also locks the door after a predetermined amount of time has elapsed since the electronic lock was unlocked.

The room exit IC card reader 3500 is configured of an IC card number obtaining portion 3600, an IC card number sending/receiving portion 3700, a door unlocking portion 3800, and the like.

The room exit IC card reader 3500 has the same function as that of the room entry IC card reader 3000.

To be specific, the IC card number obtaining portion 3600, the IC card number sending/receiving portion 3700, and the door unlocking portion 3800 have the same functions, respectively, as those of the IC card number obtaining portion 3100, the IC card number sending/receiving portion 3200, and the door unlocking portion 3300.

As just described, the room exit IC card reader 3500 has the same function as that of the room entry IC card reader 3000. However, a structural element that has received the IC card number from the room exit IC card reader 3500 or the room entry IC card reader 3000 performs different processes depending on the transmission source of the IC card number.

The IC card-based room-security server 4000 is configured of an IC card number sending/receiving portion 4100, an IC card number authentication portion 4200, a management information storage portion 4300, and the like.

The IC card number sending/receiving portion 4100 receives an IC card number and a room ID from the room entry IC card reader 3000 or the room exit IC card reader 3500, and stores, as a history of room entry/exit, the IC card number and the room ID in the management information storage portion 4300. The IC card number sending/receiving portion 4100 also requests the IC card number authentication process 4200 to perform authentication of the IC card number, and transmits the result of authentication to the transmission source of the IC card number, i.e., the room entry IC card reader 3000 or the room exit IC card reader 3500.

Responding to the request from the IC card number sending/receiving portion 4100, the IC card number authentication portion 4200 performs authentication of the IC card number, and transmits the result of authentication to the IC card number sending/receiving portion 4100. To be specific, the IC card number authentication portion 4200 determines whether or not a user possessing an IC card corresponding to the IC card number is permitted to enter the room. If the IC card number authentication portion 4200 determines that such a user is permitted to enter the room, then it means that the authentication is successful. Conversely, if the IC card number authentication portion 4200 determines that such a user is not permitted to enter the room, then it means that the authentication fails.

The management information storage portion 4300 stores, therein, information for managing users who are permitted to enter individual rooms under the control of the IC card-based room-security server 4000. The management information storage portion 4300 also stores, therein, a history of room entry/exit, for example. The information for managing users who are permitted to enter individual rooms is described next in the [DATA] section with reference to drawings.

[Data]

The following is a description of data used in the authentication system 100 of this embodiment, with reference to FIGS. 5-7.

FIG. 5 is a diagram illustrating an example of the configuration and details of management information 4310 stored in the management information storage portion 4300 of the IC card-based room-security server 4000. The management information 4310 is created in advance by an administrator of the IC card-based room-security system, and stored in the management information storage portion 4300.

The management information 4310 includes the fields of "room ID" 4311 and "card number" 4312.

The room ID field 4311 indicates a room ID that is an identifier of a room under the control of the IC card-based room-security server 4000.

The card number field 4312 indicates an IC card number of an IC card possessed by a user who is permitted to enter a room identified by a room ID.

FIG. 6 is a diagram illustrating an example of the configuration and details of user information 5110 stored in the user information storage portion 5100 of the MFP 2000. The user information 5110 is created in advance by an MFP administrator, and stored in the user information storage portion 5100.

The user information 5110 includes the fields of "user name" 5111, "password" 5112, "department" 5113, "print quantity" 5114, "copy quantity" 5115, "maximum print quantity" 5116, "maximum copy quantity" 5117, "print limit" 5118, and "copy limit" 5119.

The user information 5110 contains information about all the users who are permitted to use the MFP 2000. One record having the fields described above is registered for one user.

The user name field 5111 indicates a name of a user.

The password field 5112 indicates information based on which a determination is made as to whether or not a user indicated in the user name field 5111 is authorized to use the MFP 2000.

The department field 5113 indicates a department to which a user indicated in the user name field 5111 belongs.

The print quantity field 5114 indicates the number of prints that has been printed based on print jobs transmitted by a user indicated in the user name field 5111. The copy quantity field 5115 indicates the number of copies made by a user indicated in the user name field 5111.

The maximum print quantity field 5116 indicates the upper limit value of a print quantity to which a user indicated in the user name field 5111 is permitted to perform printing. The maximum copy quantity field 5117 indicates the upper limit value of a copy quantity to which a user indicated in the user name field 5111 is permitted to make a copy.

The print limit field 5118 indicates restrictions on a user indicated in the user name field 5111 for a case where the user performs printing. If the value of "monochrome" is specified in this field, monochrome printing is permitted and color printing is not permitted. If the value of "permitted" is specified therein, both monochrome printing and color printing are permitted. Conversely, if the value of "not permitted" is specified therein, printing itself, including monochrome printing and color printing, is not permitted.

The copy limit field 5119 indicates restrictions on a user indicated in the user name field 5111 for a case where the user makes a copy. If the value of "monochrome" is specified in this field, monochrome copying is permitted and color copying is not permitted. If the value of "permitted" is specified therein, both monochrome copying and color copying are permitted. Conversely, if the value of "not permitted" is specified therein, copying itself, including monochrome copying and color copying, is not permitted.

FIG. 7 is a diagram illustrating an example of the configuration and details of an in/out management table 5210 stored in the management table storage portion 5200 of the MFP 2000.

The in/out management table 5210 includes the fields of "card number" 5211, "user name" 5212, and "in/out" 5213.

An MFP administrator, in advance, fills in the card number field 5211 and the user name field 5212, and stores, in the in/out management table 5210, the values filled therein.

The card number field 5211 indicates a card number of an IC card possessed by a user who is permitted to enter a room where the MFP 2000 is installed. The card number field 5211 indicates IC card numbers of IC cards of all the users who are permitted to enter the room where the MFP 2000 is installed. To be specific, with reference to FIGS. 5 and 7, the card number field 5211 indicates all the card numbers in the card number field 4312 corresponding to the Room 01 specified in the room ID field 4311 of the management information 4310. As described above, the management information 4310 is stored in the management information storage portion 4300 of the IC card-based room-security server 4000.

Referring back to FIG. 7, the user name field 5212 indicates a name of a user possessing an IC card corresponding to an IC card number specified in the card number field 5211.

The in/out field 5213 indicates whether a user corresponding to an IC card number indicated in the card number field 5211 is present in the room or absent therefrom. If the value of "IN" is indicated in the in/out field 5213, such a user is present in the room. In contrast, if the value of "OUT" is indicated therein, such a user is absent from the room. The control portion 2100 rewrites values of the in/out field 5213 appropriately.

[Indication on Display]

Descriptions are given below of main indications on a display used in the authentication system 100 of this embodiment, with reference to FIGS. 8-10. The indications on a display described herein are examples of indications made on the operational panel 20f of the MFP 2000.

Figure 8:
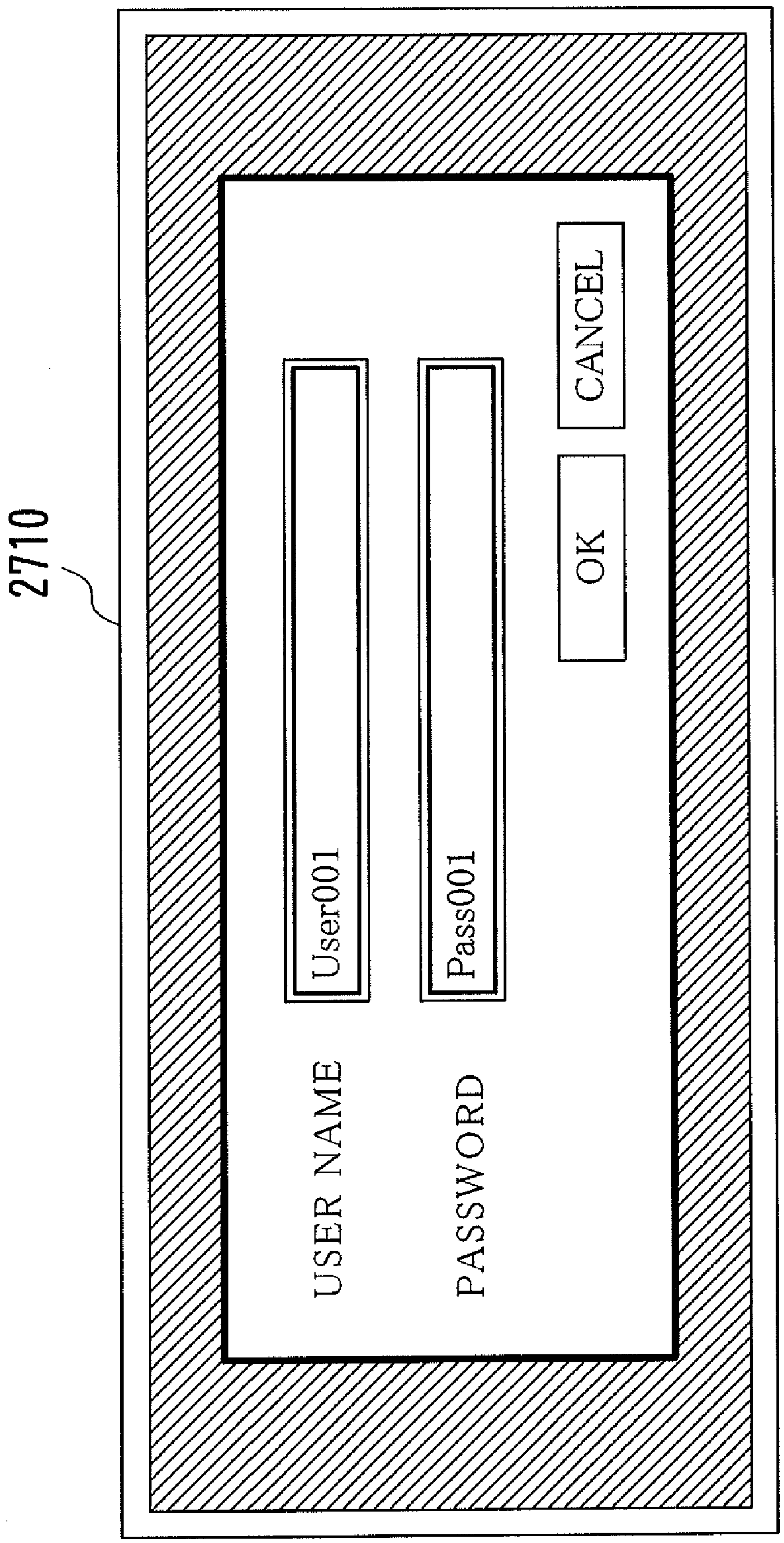
FIG. 8 is a diagram illustrating an example of a log-on screen.

FIG. 8 is a diagram illustrating an example of a log-on screen 2710.

A user enters, on the log-on screen 2710, a user name and a password in the individual entry fields, and then presses an "OK" button.

Figure 9:
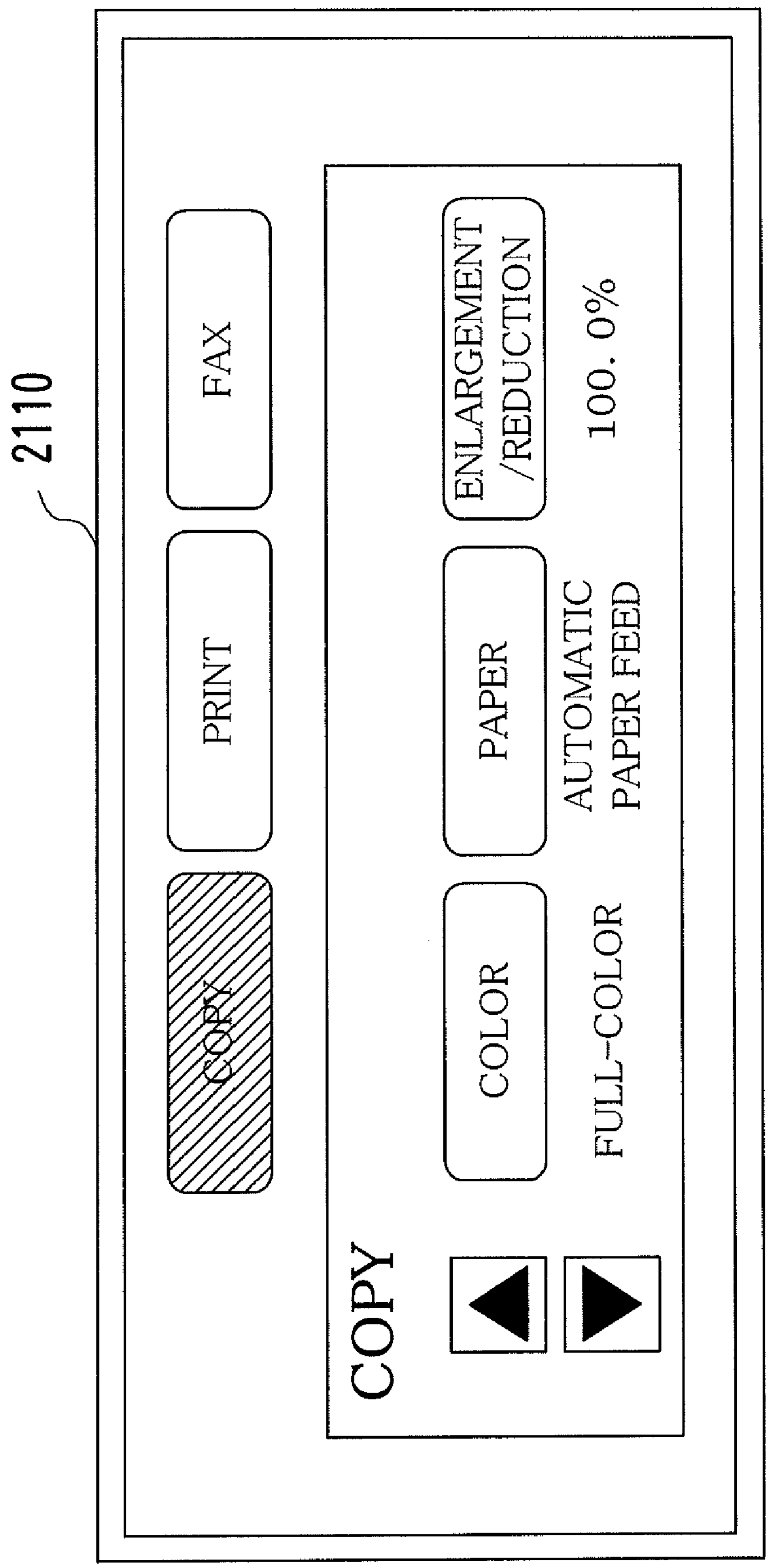
FIG. 9 is a diagram illustrating an example of an initial screen.

FIG. 9 is a diagram illustrating an example of an initial screen 2110 that is displayed first when the user is authenticated after the entry of the user name and the password on the log-on screen 2710. The initial screen 2110 is a screen for the user to instruct the MFP 2000 to perform image formation. In the illustrated example, "copy" is selected on the initial screen 2110.

Figure 10:
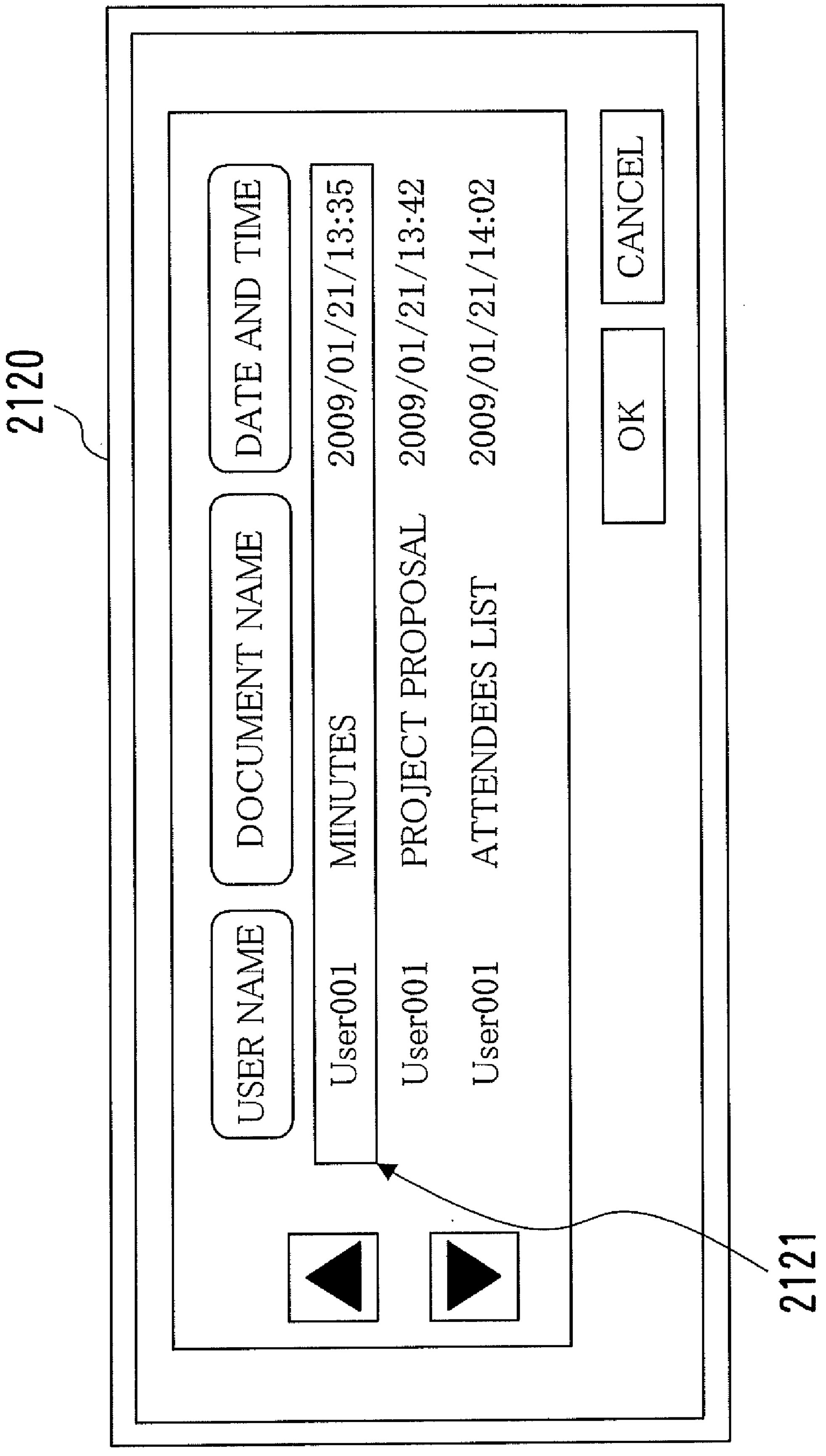
FIG. 10 is a diagram illustrating an example of a print job list screen.

FIG. 10 is a diagram illustrating an example of a print job list screen 2120 displayed when the user presses a "print" button on the initial screen 2110.

The print job list screen 2120 is to display a list of print jobs that are received by the MFP 2000 and stored therein. The user moves a cursor 2121 to select a desired print job. In the illustrated example, a print job having a document name of "minutes" is selected by moving the cursor 2121. If the user presses an "OK" button, then a process such as printing corresponding to the selected print job is performed.

[Print Job]

Descriptions are given below of a print job used in the authentication system 100 of this embodiment, with reference to FIG. 11.

Figure 11:
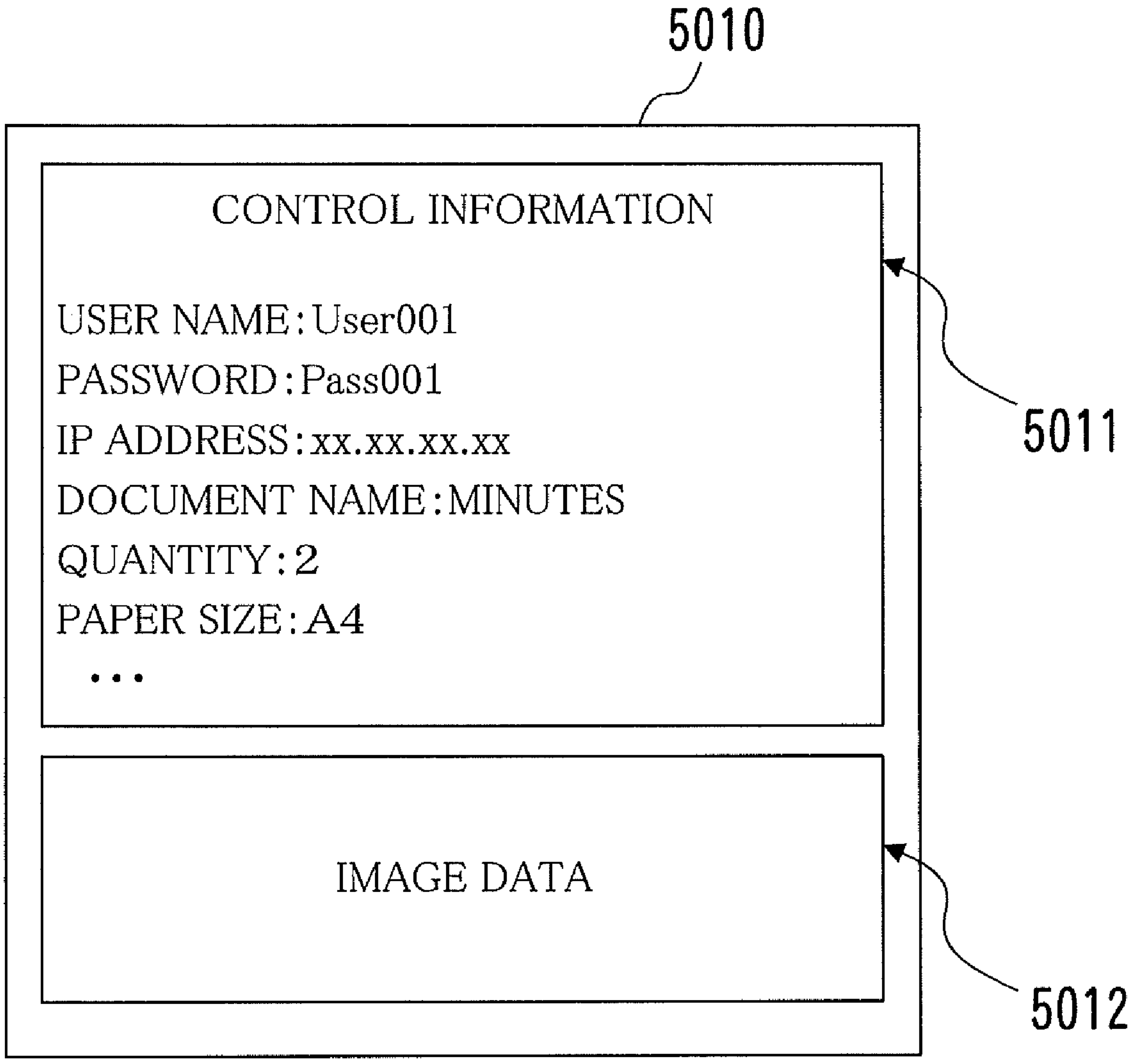
FIG. 11 is a diagram illustrating an example of a print job.

FIG. 11 is a diagram illustrating an example of a print job 5010.

The print job 5010 includes control information 5011 and image data 5012.

The control information 5011 contains information about a user name, a password, an IP address, a document name, a quantity, a paper size, and the like.

The user name is a name of a user using the user terminal 1000. The password is information for verifying the authenticity of the user.

The IP address indicates a transmission source of the print job 5010. The document name is an identifier of the print job 5010 for the user. The quantity indicates the number of printings based on the image data 5012. The paper size is a size of paper for printing.

The image data 5012 is data of, for example, a document to be printed, and is provided in a predetermined format such as PDF, TIFF, or JPEG.

[Operation]

Figure 12:
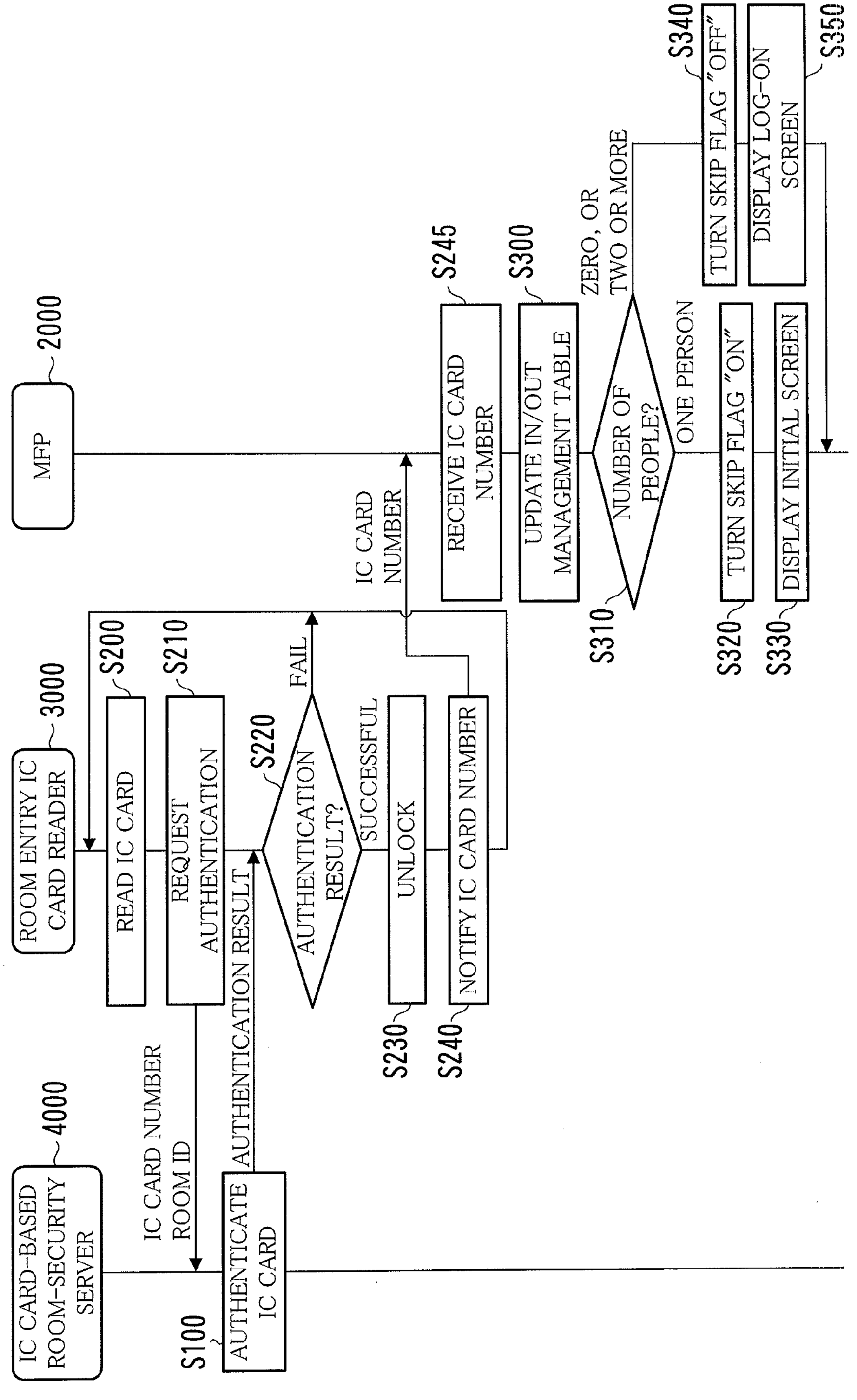
FIG. 12 is a flowchart illustrating an example of the processing flow when a user enters a room.
Figure 13:
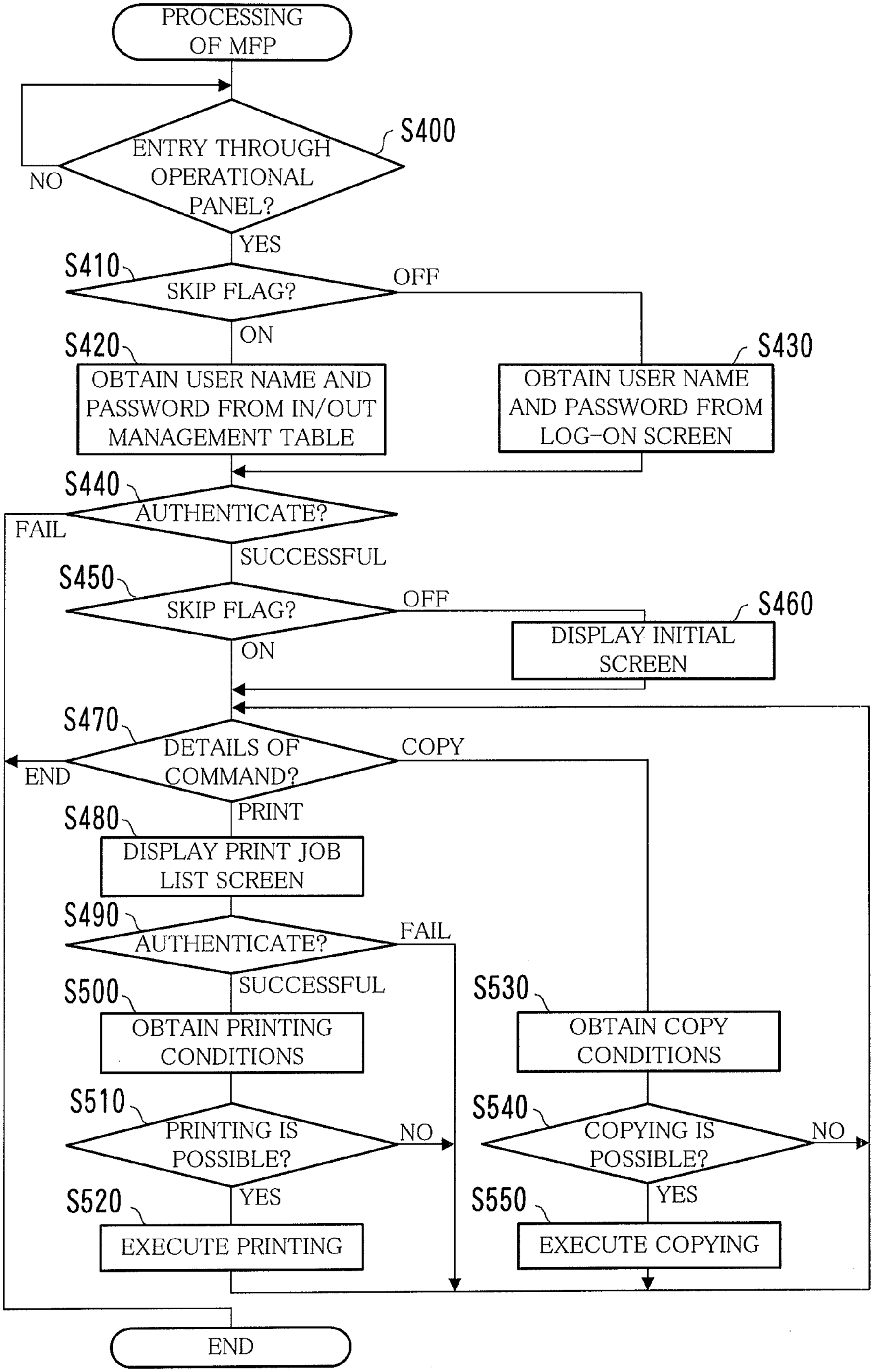
FIG. 13 is a flowchart illustrating an example of the processing flow of an MFP.
Figure 14:
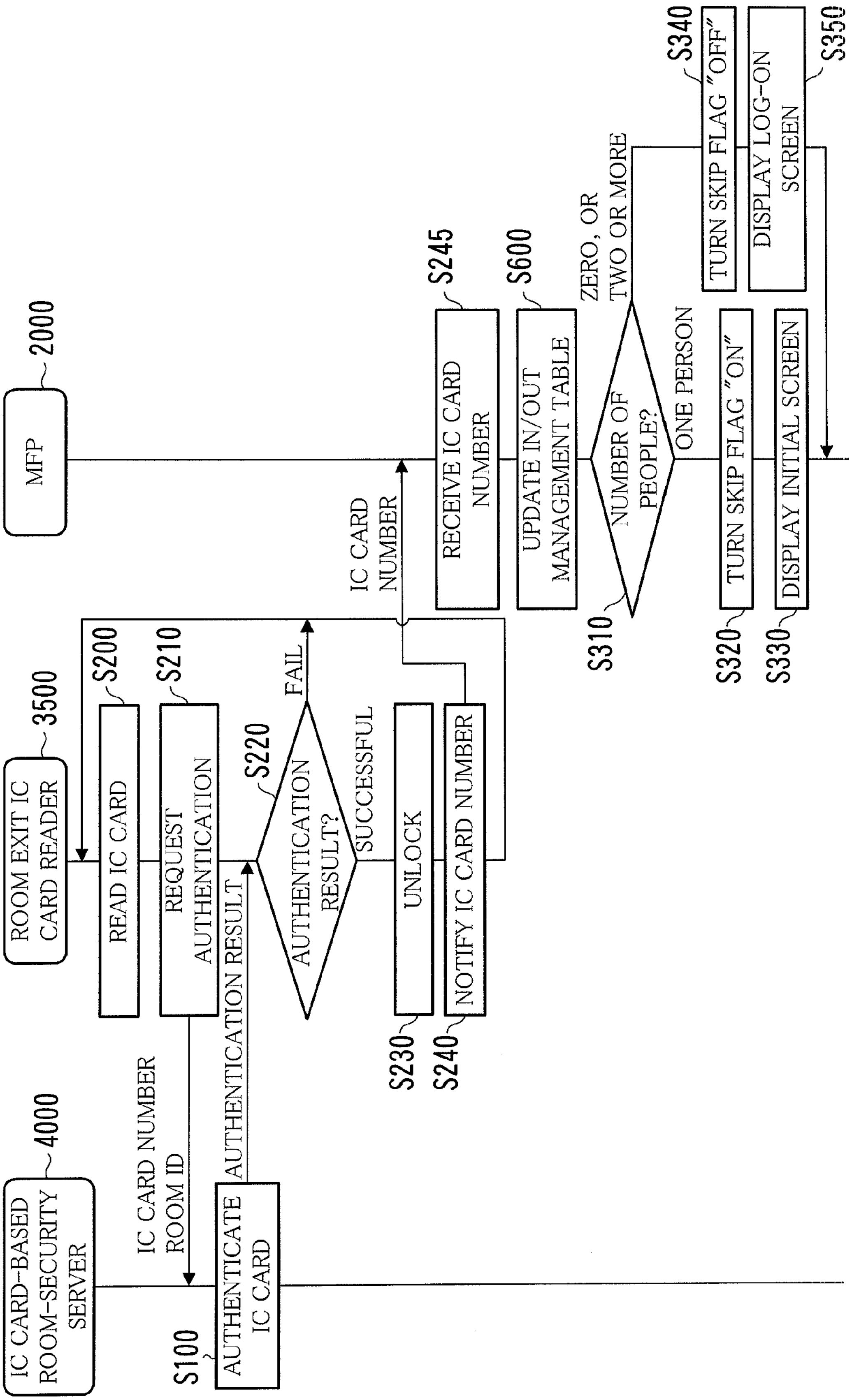
FIG. 14 is a flowchart illustrating an example of the processing flow when a user leaves a room.

The following is a description of operation performed in the authentication system 100 of this embodiment, with reference to FIGS. 12-14.

FIG. 12 is a flowchart illustrating an example of the processing flow when a user enters a room.

The user holds an IC card possessed by him/her over the room entry IC card reader 3000 in order to enter the room named "Room 01" (see FIG. 2).

The IC card number obtaining portion 3100 of the room entry IC card reader 3000 reads out an IC card number from the IC card (Step S200).

The IC card number obtaining portion 3100 sends the IC card number thus read out to the IC card number sending/receiving portion 3200, and requests the IC card number sending/receiving portion 3200 to transmit the IC card number to the IC card-based room-security server 4000.

Responding to this, the IC card number sending/receiving portion 3200 transmits the IC card number together with a room ID of the room to the IC card-based room-security server 4000, and requests the same to perform authentication of the IC card number and the room ID (Step S210). Note that the room entry IC card reader 3000 stores, in an internal memory thereof, a room ID of the room where the room entry IC card reader 3000 itself is installed. The same applies to the room exit IC card reader 3500.

The IC card number sending/receiving portion 4100 of the IC card-based room-security server 4000 receives the IC card number and the room ID from the room entry IC card reader 3000.

The IC card number sending/receiving portion 4100 sends the IC card number and the room ID thus received to the IC card number authentication portion 4200, and requests the same to perform authentication thereof. The IC card number sending/receiving portion 4100 also stores, in the management information storage portion 4300, the IC card number and the room ID as a room entry/exit history.

The IC card number authentication portion 4200 that has received the request for authentication searches for the room ID and the IC card number for which the authentication is requested in the room ID field 4311 and the card number field 4312 of the management information 4310 stored in the management information storage portion 4300. If the room ID and the IC card number are registered in the fields of the management information 4310, then the IC card number authentication portion 4200 sends, to the IC card number sending/receiving portion 4100, a result indicating that the authentication is successful (Step S100). If the room ID and the IC card number are not registered in the fields of the management information 4310, then the IC card number authentication portion 4200 sends, to the IC card number sending/receiving portion 4100, a result indicating that the authentication fails (Step S100).

Responding to this, the IC card number sending/receiving portion 4100 transmits, to the room entry IC card reader 3000, the result of authentication received from the IC card number authentication portion 4200.

The IC card number sending/receiving portion 3200 of the room entry IC card reader 3000 receives the result of authentication from the IC card-based room-security server 4000.

The IC card number sending/receiving portion 3200 performs no operation if the result indicates that the authentication fails (Step S220: Fail).

The IC card number sending/receiving portion 3200 instructs the door unlocking portion 3300 to unlock an electronic lock on the door if the result indicates that the authentication is successful (Step S220: Successful).

Responding to this, the door unlocking portion 3300 unlocks the electronic lock on the door (Step S230).

After issuing the instruction to unlock the door, the IC card number sending/receiving portion 3200 transmits, to the MFP 2000, the IC card number sent from the IC card number obtaining portion 3100 (Step S240).

The IC card number receiving portion 2200 of the MFP 2000 receives the IC card number from the room entry IC card reader 3000 (Step S245).

The IC card number receiving portion 2200 then informs the control portion 2100 that the user has entered the room, and sends thereto the received IC card number.

After receiving the IC card number, the control portion 2100 updates the in/out management table 5210 stored in the management table storage portion 5200 (Step S300).

To be specific, the control portion 2100 searches for the same card number as the received IC card number in the card number field 5211 of the in/out management table 5210. The control portion 2100 then sets the value of "IN" in the in/out field 5213 of a record corresponding to the card number found by the search. This is because it is already informed by the IC card number receiving portion 2200 that the user has entered the room.

The control portion 2100 then asks the head count determination portion 2300 as to how many people are present in the room.

Responding to this, the head count determination portion 2300 searches in the in/out field 5213 of the in/out management table 5210, and calculates the number of records for which the value of "IN" is set. Thereafter, the head count determination portion 2300 sends information on the calculated number, as the number of people present in the room, to the control portion 2100.

Responding to this, if the number of people present in the room is 1 (Step S310: One person), then the control portion 2100 turns the skip flag "ON" (Step S320), and displays the initial screen 2110 (see FIG. 9) on the operational panel 20*f* (Step S330). Note that the skip flag is stored in a work memory contained in the control portion 2100.

In contrast, if the number of people is zero, or two or more (Step S310: Zero, or two or more), then the control portion 2100 turns the skip flag "OFF" (Step S340), and displays the log-on screen 2710 (see FIG. 8) on the operational panel 20*f* (Step S350).

The following is a description of a case in which the MFP 2000 performs printing or the like, with reference to FIG. 13.

FIG. 13 is a flowchart illustrating an example of the processing flow of the MFP 2000.

The user who has entered the Room 01 operates the user terminal 1000 to specify image data, and gives a print command.

The control portion 1100 of the user terminal 1000 obtains the print command given by the user and the specified image data. The control portion 1100 then requests the print job transmission portion 1200 to transmit a print job for printing the specified image data to the MFP 2000.

Responding to this, the print job transmission portion 1200 generates a print job (see FIG. 11) including the image data 5012 specified and the control information 5011 containing information about a quantity, a paper size, and the like.

The print job transmission portion 1200 transmits the print job thus generated to the MFP 2000.

The print job receiving portion 2900 determines whether or not the print job received from the user terminal 1000 is a print job transmitted by a user who is permitted to use the MFP 2000. To be specific, if the user name and the password contained in the control information 5011 of the print job 5010 are registered in the fields of the user name 5111 and the password 5112 of the user information 5110 stored in the user information storage portion 5100, then the print job receiving portion 2900 determines that the print job has been transmitted by a user who is permitted to use the MFP 2000. Otherwise, the print job receiving portion 2900 determines that the print job has been transmitted by a user who is not permitted to use the MFP 2000.

In the former case, the print job receiving portion 2900 stores the print job in the print job storage portion 5000.

The user who has operated the user terminal 1000 to give the print command approaches the MFP 2000 in order to operate the MFP 2000 to perform printing based on the image data.

The user touches the operational panel 20*f* of the MFP 2000.

The control portion 2100 detects that the user intends to perform operation through the operational panel 20*f* (Step S400: Yes), and checks the status of the skip flag (Step S410).

In the case where the skip flag is "ON" (Step S410: ON), the initial screen 2110 is displayed, instead of the log-on screen 2710, on the operational panel 20*f*. The control portion 2100 thus obtains a user name and password for authentication from the in/out management table 5210 stored in the management table storage portion 5200 and the user information 5110 stored in the user information storage portion 5100 (Step S420).

Specifically, the control portion 2100 searches for a record having the value of "IN" in the in/out field 5213 of the in/out management table 5210. In the case where the skip flag is "ON", the number of people in the room is one, which means that the number of records having the value of "IN" in the in/out field 5213 is one. Thus, a user name in the user name field 5212 of the record found by the search is obtained as the user name for authentication.

In short, since the number of people present in the room is one, the number of users using the MFP 2000 is also one. Stated differently, it is impossible that a user name for authentication to be entered into the MFP 2000 is a user name other than the user name of the user who is present in the room. Thus, it is only necessary to obtain, as the user name for authentication, the user name of the user who is present in the room from the in/out management table 5210. This dispenses with the need for the user to enter the user name and the like for authentication.

Next, the user name field 5111 of the user information 5110 is searched by using the user name for authentication. Then, a password indicated in the password field 5112 of a record having the same user name as the user name for authentication is obtained as the password for authentication.

On the other hand, in the case where the skip flag is "OFF" (Step S410: OFF), the log-on screen 2710 is displayed on the operational panel 20*f*. The control portion 2100 thus obtains a user name and password for authentication from the log-on screen 2710 (Step S430).

Specifically, when detecting that the user has pressed the "OK" button on the log-on screen 2710, the control portion 2100 obtains the user name and the password entered in the individual entry fields as the user name and password for authentication.

The control portion 2100 sends the obtained user name and password for authentication to the log-on information authentication portion 2800, and requests the log-on information authentication portion 2800 to perform authentication of the user name and the password.

Responding to this, the log-on information authentication portion 2800 searches for the user name and the password for which the authentication is requested in the user name field 5111 and the password field 5112 of the user information 5110 stored in the user information storage portion 5100. If the user name and the password are registered in the fields of the user information 5110, then the log-on information authentication portion 2800 sends, to the control portion 2100, a result indicating that the authentication is successful (Step S440). If the user name and the password are not registered in the fields of the user information 5110, then the log-on information authentication portion 2800 sends, to the control portion 2100, a result indicating that the authentication fails (Step S440).

If the result indicates that the authentication fails (Step S440: Fail), then the control portion 2100 displays the log-on screen 2710 on the operational panel 20*f* and waits for the user to log onto the MFP 2000.

If the result indicates that the authentication is successful (Step S440: Successful), then the control portion 2100 checks the status of the skip flag (Step S450).

In the case where the skip flag is "ON" (Step S450: ON), the initial screen 2110 is displayed on the operational panel 20*f*. The control portion 2100 thus detects operation performed on the initial screen 2110 by the user.

In contrast, in the case where the skip flag is "OFF" (Step S450: OFF), the log-on screen 2710 is to be displayed on the operational panel 20*f*. The control portion 2100 thus displays, on the operational panel 20*f*, the initial screen 2110 instead of the log-on screen 2710 (Step S460). The control portion 2100 then detects operation performed on the initial screen 2110 by the user.

If detecting that the user performs operation for closing the initial screen 2110 to return to the log-on screen 2710 (Step S470: End), then the control portion 2100 displays the log-on screen 2710 on the operational panel 20*f* and waits for the user to log onto the MFP 2000.

If detecting that the operation performed on the initial screen 2110 by the user is printing (Step S470: Print), then the control portion 2100 displays the print job list screen 2120 (see FIG. 10) on the operational panel 20*f* (Step S480).

Specifically, the control portion 2100 creates a list of print jobs stored in the print job storage portion 5000, and displays the list.

The user specifies a document to be printed on the print job list screen 2120, and presses the "OK" button.

When detecting that the document, i.e., the print job, has been specified, the control portion 2100 requests the print job authentication portion 2400 to perform authentication of the specified print job. At this time, the control portion 2100 sends the user name and password for authentication to the print job authentication portion 2400. Further, the control portion 2100 reads out the control information 5011 of the specified print job 5010 stored in the print job storage portion 5000, and sends the control information 5011 to the print job authentication portion 2400.

Responding to this, the print job authentication portion 2400 compares a user name and password contained in the control information 5011 with the received user name and password for authentication.

If the user name and password contained in the control information 5011 are respectively the same as the received user name and password for authentication, then the print job authentication portion 2400 sends, to the control portion 2100, a result indicating that the authentication is successful.

In contrast, if the user name and password contained in the control information 5011 are different from the received user name and password for authentication, then the print job authentication portion 2400 sends, to the control portion 2100, a result indicating that the authentication fails.

If the result, received from the print job authentication portion 2400, indicates that the authentication fails (Step S490: Fail), then the control portion 2100 does not perform printing, displays the initial screen 2110, and waits for the user to perform the subsequent operation.

In contrast, if the result indicates that the authentication is successful (Step S490: Successful), then the control portion 2100 refers to the user information 5110 stored in the user information storage portion 5100, and obtains printing conditions therefrom (Step S500).

To be specific, the control portion 2100 obtains values in the fields of the print quantity 5114, the maximum print quantity 5116, and the print limit 5118 of a record having the same name in the user name field 5111 as the user name for authentication.

Then, the control portion 2100 determines whether or not printing is possible (Step S510).

To be specific, if the value in the print quantity field 5114 does not exceed the value in the maximum print quantity field 5116, and if printing conditions specified in the control information 5011 of the print job 5010 are not against restrictions in the print limit field 5118, then the control portion 2100 determines that printing is possible. If the value in the print quantity field 5114 exceeds the value in the maximum print quantity field 5116, or if printing conditions specified in the control information 5011 of the print job 5010 are against restrictions in the print limit field 5118, then the control portion 2100 determines that printing is impossible.

If determining that printing is possible (Step S510: Yes), then the control portion 2100 requests the print process portion 2500 to perform printing based on the print job 5010 specified by the user.

Responding to this, the print process portion 2500 refers to the print job 5010 specified by the user and stored in the print job storage portion 5000. The print process portion 2500 then performs printing onto paper based on the image data 5012 of the print job 5010 and ejects the paper (Step S520).

After making the request for printing, the control portion 2100 updates the value in the print quantity field 5114, displays the initial screen 2110, and waits for the user to perform the subsequent operation.

On the other hand, if determining that printing is impossible (Step S510: No), then the control portion 2100 does not perform printing, displays the initial screen 2110, and waits for the user to perform the subsequent operation.

If detecting that the operation performed on the initial screen 2110 by the user is copying (Step S470: Copy), then the control portion 2100 refers to the user information 5110 stored in the user information storage portion 5100, and obtains copying conditions therefrom (Step S530).

To be specific, the control portion 2100 obtains values in the fields of the copy quantity 5115, the maximum copy quantity 5117, and the copy limit 5119 of a record having the same name in the user name field 5111 as the user name for authentication.

Then, the control portion 2100 determines whether or not copying is possible (Step S540).

To be specific, if the value in the copy quantity field 5115 does not exceed the value in the maximum copy quantity field 5117, and if copying conditions specified on the initial screen 2110 are not against restrictions in the copy limit field 5119, then the control portion 2100 determines that copying is possible. If the value in the copy quantity field 5115 exceeds the value in the maximum copy quantity field 5117, or if copying conditions specified on the initial screen 2110 are against restrictions in the copy limit field 5119, then the control portion 2100 determines that copying is impossible.

If determining that copying is possible (Step S540: Yes), then the control portion 2100 requests the scanner process portion 2600 and the print process portion 2500 to perform copying.

Responding to this, the scanner process portion 2600 scans images such as characters depicted on paper, generates image data thereof, and sends the image data to the print process portion 2500 via the memory. The print process portion 2500 then performs printing onto paper based on the image data sent from the scanner process portion 2600 and ejects the paper (Step S550).

After making the request for copying, the control portion 2100 updates the value in the copy quantity field 5115, displays the initial screen 2110, and waits for the user to perform the subsequent operation.

On the other hand, if determining that copying is impossible (Step S540: No), then the control portion 2100 does not perform copying, displays the initial screen 2110, and waits for the user to perform the subsequent operation.

FIG. 14 is a flowchart illustrating an example of the processing flow when a user leaves a room.

The processes for a case where a user leaves a room are substantially the same as those for a case where a user enters a room described earlier with reference to FIG. 12.

Referring to FIGS. 12 and 14, processes with the same step numbers have the same contents to be processed. Note, however, that the processes, of FIG. 12, performed by the room entry IC card reader 3000 are carried out by the room exit IC card reader 3500 as shown in FIG. 14.

As to the processes for a case where a user leaves a room, the following two points are different from the processes for a case where a user enters a room.

The first difference is that the user holds an IC card possessed by him/her over the room exit IC card reader 3500, instead of the room entry IC card reader 3000, in order to leave the Room 01.

The second difference is the details to be updated in the in/out management table 5210. Specifically, in the case of FIG. 12, the value of "IN" is set in the in/out management table 5210 because a user has entered the room. In contrast, in the case of FIG. 14, the value of "OUT" is set in the in/out management table 5210 because a user has left the room.

The following is a description of the process for updating the in/out management table 5210 (Step S600).

The IC card number receiving portion 2200 of the MFP 2000 receives an IC card number from the room exit IC card reader 3500.

The IC card number receiving portion 2200 then informs the control portion 2100 that the user has left the room, and sends the received IC card number to the control portion 2100.

Responding to this, the control portion 2100 updates the in/out management table 5210 stored in the management table storage portion 5200 (Step S600).

To be specific, the control portion 2100 searches for the same card number as the received IC card number in the card number field 5211 of the in/out management table 5210. Then, the control portion 2100 sets the value of "OUT" in the in/out field 5213 of a record corresponding to the card number found by the search. This is because it is already informed by the IC card number receiving portion 2200 that the user has left the room.

Although the embodiment of the present invention has been described above, the present invention is not limited thereto. The following arrangement is possible.

1) In the embodiment described above, a case where a user is alone in the room is regarded as a situation where the confidentiality is protected. In such a case, the user is not required to enter authentication information. However, another case may be regarded as the situation where the confidentiality is protected.

For example, a case where information indicating a department to which a user belongs (department information), which is one of attributes of the user, is common to users may be regarded as the situation where the confidentiality is protected. Stated differently, a case where all the users who are present in the room belong to the same department is regarded as the situation where the confidentiality is protected.

In such a case, for example, it is determined whether or not the department field 5113 of records corresponding to the individual users have the same value, instead of detecting how many users are present in the room by the head count determination portion 2300. If it is determined that all the users belong to the same department, then the skip flag is turned "ON" and processes are performed. In contrast, if it is not determined that all the users belong to the same department, then the skip flag is turned "OFF" and processes are performed. Further, instead of a user name and a password for each user, a user name and a password for each department are used as a user name and a password necessary for logging onto the MFP 2000. The same applies to a user name and a password included in a print job.

2) In the embodiment discussed above, when a user logs onto the MFP, authentication is performed based on a user name and a password. However, another authentication method is applicable. For example, authentication may be performed based on a card number of an IC card or biometric information such as a fingerprint or vein patterns.

3) The embodiment describes a case where an MFP performs authentication based on authentication information for the IC card-based room-security system. The embodiment, however, is not limited to the MFP, and is applicable to any devices as long as the devices perform authentication by using authentication information.

4) Although the embodiment describes a case where the user terminal 1000 is installed with the MFP 2000 in the Room 01, the embodiment is not limited thereto.

For example, a configuration is possible in which the user terminal 1000 is installed outside a room where the MFP 2000 is installed.

5) The whole or a part of the individual elements of the authentication system shown in, for example, FIG. 4 may be realized in the form of a one-chip integrated circuit or multitip integrated circuits.

6) The whole or a part of the individual elements in the authentication system shown in, for example, FIG. 4 may be realized by a computer program, or may be implemented in any other formats.

In the case of a computer program, a computer is preferably caused to load the computer program written onto a recording medium such as a memory card or a CD-ROM, and to execute the computer program. Alternatively, a computer is preferably caused to download a computer program via a network and to execute the computer program.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An authentication system comprising:

a room-security device; and an information processing apparatus installed in a controlled area controlled by the room-security device, wherein the room-security device and the information processing apparatus are connected in a network, the room-security device includes an identification information obtaining portion that obtains, from a user, identification information of the user, and a control portion that performs a room entry control and a room exit control of the user based on the identification information obtained by the identification information obtaining portion, and transmits, if the user is permitted to enter a room, the identification information to the information processing apparatus, the information processing apparatus includes a receiving portion that receives the identification information from the control portion, and an authentication portion that asks the user to enter authentication information to obtain the authentication information, and performs authentication based on the authentication information thus obtained, and if the authentication portion detects, based on the identification information received by the receiving portion, that the user is alone in the controlled area, then the authentication portion stops asking the user to enter the authentication information to obtain the authentication information, and performs the authentication based on the identification information obtained by the identification information obtaining portion of the room-security device.

2. An authentication system comprising:

a room-security device; and an information processing apparatus installed in a controlled area controlled by the room-security device, wherein the room-security device and the information processing apparatus are connected in a network, the room-security device includes an identification information obtaining portion that obtains, from a user, identification information of the user, and a control portion that performs a room entry control and a room exit control of the user based on the identification information obtained by the identification information obtaining portion, and transmits, if the user is permitted to enter a room, the identification information to the information processing apparatus, the information processing apparatus includes a receiving portion that receives the identification information from the control portion, and an authentication portion that asks the user to enter authentication information to obtain the authentication information, and performs authentication based on the authentication information thus obtained, and if the authentication portion detects, based on the identification information received by the receiving portion, that the user present in the controlled area has a predetermined attribute identical to predetermined attributes of other users present in the controlled area, then the authentication portion stops asking the user to enter the authentication information to obtain the authentication information, and performs the authentication based on the identification information obtained by the identification information obtaining portion of the room-security device.

3. The authentication system according to claim 2, wherein the predetermined attribute is information about affiliation of the user.

4. The authentication system according to claim 1, wherein the information processing apparatus is an image forming apparatus, and the image forming apparatus permits the user to use the image forming apparatus itself only if the authentication performed by the authentication portion is successful.

5. The authentication system according to claim 4, wherein the image forming apparatus includes a display portion configured to display a log-on screen for the user to enter the authentication information, and if the authentication portion detects that the user is alone in the controlled area, then the authentication portion causes the display portion to display a screen through which a command to perform image formation is given, and if the authentication portion does not detect that the user is alone in the controlled area, then the authentication portion causes the display portion to display the log-on screen.

6. An information processing apparatus used in an authentication system, the information processing apparatus being included in the authentication system and installed in a controlled area controlled by a room-security device that is included in the authentication system, the information processing apparatus and the room-security device being connected in a network, the information processing apparatus comprising:

a receiving portion that receives identification information obtained by the room-security device; and an authentication portion that asks a user to enter authentication information to obtain the authentication information, and performs authentication based on the authentication information thus obtained, wherein, if the authentication portion detects that the user is alone in the controlled area based on the identification information received by the receiving portion, then the authentication portion stops asking the user to enter the authentication information to obtain the authentication information, and performs the authentication based on the identification information obtained by the room-security device.

7. An information processing apparatus used in an authentication system, the information processing apparatus being included in the authentication system and installed in a controlled area controlled by a room-security device that is included in the authentication system, the information processing apparatus and the room-security device being connected in a network, the information processing apparatus comprising:

a receiving portion that receives identification information obtained by the room-security device; and an authentication portion that asks a user to enter authentication information to obtain the authentication information, and performs authentication based on the authentication information thus obtained, wherein, if the authentication portion detects, based on the identification information received by the receiving portion, that the user present in the controlled area has a predetermined attribute identical to predetermined attributes of other users present in the controlled area, then the authentication portion stops asking the user to enter the authentication information to obtain the authentication information, and performs the authentication based on the identification information obtained by the room-security device.

8. The information processing apparatus according to claim 6, wherein the information processing apparatus is an image forming apparatus, and the image forming apparatus permits the user to use the image forming apparatus itself only if the authentication performed by the authentication portion is successful.

9. An authentication method used in an information processing apparatus that is included in an authentication system and is installed in a controlled area controlled by a room-security device that is included in the authentication system, the information processing apparatus and the room-security device being connected in a network, the authentication method comprising:

a receiving step of receiving identification information obtained by the room-security device; and an authentication step of asking a user to enter authentication information to obtain the authentication information, and performing authentication based on the authentication information thus obtained, wherein, if it is detected, in the authentication step, that the user is alone in the controlled area based on the identification information that has been previously received, then the authentication step includes stopping asking the user to enter the authentication information to obtain the authentication information, and performing the authentication based on the identification information obtained by the room-security device.

10. An authentication method used in an information processing apparatus that is included in an authentication system and is installed in a controlled area controlled by a room-security device that is included in the authentication system, the information processing apparatus and the room-security device being connected in a network, the authentication method comprising:

a receiving step of receiving identification information obtained by the room-security device; and an authentication step of asking a user to enter authentication information to obtain the authentication information, and performing authentication based on the authentication information thus obtained, wherein, if it is detected, in the authentication step, based on the identification information received in the receiving step, that the user present in the controlled area has a predetermined attribute identical to predetermined attributes of other users present in the controlled area, then the authentication step includes stopping asking the user to enter the authentication information to obtain the authentication information, and performing the authentication based on the identification information obtained by the room-security device.

11. A non-transitory computer-readable storage medium storing thereon a computer program used in an information processing apparatus that is included in an authentication system and is installed in a controlled area controlled by a room-security device that is included in the authentication system, the information processing apparatus and the room-security device being connected in a network, the computer program causing the information processing apparatus to perform an authentication process comprising: a receiving step of receiving identification information obtained by the room-security device; and an authentication step of asking a user to enter authentication information to obtain the authentication information, and performing authentication based on the authentication information thus obtained, wherein, if it is detected, in the authentication step, that the user is alone in the controlled area based on the identification information that has been previously received, then the authentication step includes stopping asking the user to enter the authentication information to obtain the authentication information, and performing the authentication based on the identification information obtained by the room-security device.

12. A non-transitory computer-readable storage medium storing thereon a computer program used in an information processing apparatus that is included in an authentication system and is installed in a controlled area controlled by a room-security device that is included in the authentication system, the information processing apparatus and the room-security device being connected in a network, the computer program causing the information processing apparatus to perform an authentication process comprising: a receiving step of receiving identification information obtained by the room-security device; and an authentication step of asking a user to enter authentication information to obtain the authentication information, and performing authentication based on the authentication information thus obtained, wherein, if it is detected, in the authentication step, based on the identification information received in the receiving step, that the user present in the controlled area has a predetermined attribute identical to predetermined attributes of other users present in the controlled area, then the authentication step includes stopping asking the user to enter the authentication information to obtain the authentication information, and performing the authentication based on the identification information obtained by the room-security device.

* * * * *